Oct. 11, 1949.　　A. R. MEUSSDORFFER　　2,484,386
MOTOR ROTOR

Filed Feb. 23, 1946

Inventor
Arthur R. Meussdorffer
By F. L. Walker
Attorney

Patented Oct. 11, 1949

2,484,386

UNITED STATES PATENT OFFICE 2,484,386

MOTOR ROTOR

Arthur Reynold Meussdorffer, North Hollywood, Calif., assignor to Robbins & Myers, Inc., Springfield, Ohio, a corporation of Ohio Application February 23, 1946, Serial No. 649,597

10 Claims. (Cl. 172—120)

1

This invention pertains to electric motors of the hysteresis type, and more particularly to the construction and mode of assembly of a rotor element therefor.

Briefly stated, there is contemplated herein a specially designed induction rotor for cooperation with a conventional distributed field or stator structure, such as is ordinarily embodied in induction motors. The magnetic flux passing between the stator poles traverse the rotor in a generally peripheral direction. To develop a high hysteresis torsue in the rotor, it is desirable that it be operated at a high flux density by confining the magnetic flux path to the peripheral portion of the rotor. The latter comprises a stack of hardened steel rings having relatively narrow radial faces and comparatively large circular openings, which forms a magnetic shell or sleeve. These magnetic rings are carried in concentric spaced relation with an axially disposed rotor shaft by non-magnetic supports or a spider, thus eliminating eddy currents within the rotor.

The object of the invention is to improve the construction as well as the means and mode of operation of hysteresis motor rotor members, whereby they may not only be economically manufactured, but will be more efficient in use, light in weight, afford maximum hysteresis torque, and having a low moment of inertia.

A further object of the invention is to provide an improved non-magnetic core or mounting support for the rotor rings by which the magnetic path may be confined to the peripheral portion of the rotor.

A further object of the invention is to provide an annular magnetic member of relatively small radial face and having a comparatively large uninterrupted central opening therein as a component element of a hysteresis motor rotor.

A further object of the invention is to increase the flux density of the hysteresis type rotor, thereby materially increasing its efficiency and develop maximum hysteresis torque by confining the magnetic flux path to a shallow peripheral portion of the rotor body.

A further object of the invention is to provide a non-magnetic mounting spider for the rotor rings comprising multiple relatively adjustable interchangeable segments or shims.

A further object of the invention is to provide a mounting support for an assembly of rotor rings having warped protruding blades for accelerating and distributing air currents relative to the rotor.

A further object of the invention is to provide

2 an induction type motor rotor embodying the advantageous structural features and inherent advantageous characteristics and mode of assembly and operation hereinafter set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is shown the preferred but not necessarily the only form of embodiment of the invention, Fig. 1 is a perspective view of an induction motor rotor in which the present invention is embodied.

Like parts are indicated by similar characters of reference throughout the several views.

Figure 1:
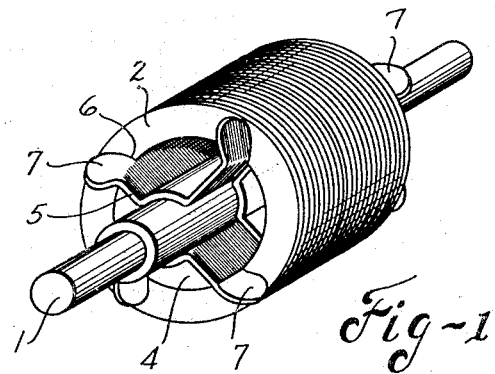
Figure 3:
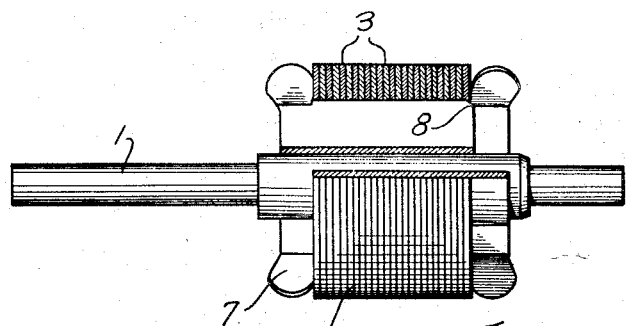
Fig. 3 is a longitudinal sectional view of an assembled rotor of the instant construction.

While the present invention is especially desirable for use in a hysteresis type motor, various features herein disclosed, including the sectional supporting spider and air fan blades thereon, the reduction of weight and low moment of inertia afforded by the instant construction are advantageous when incorporated in conventional types of induction motors, as well as when embodied in hysteresis type motors.

Referring to the drawings, 1 indicates the rotor shaft about which is concentrically disposed a stack of superposed continuous flat rings 2 of magnetic material, having relatively narrow radial faces 3 and comparatively larger uninterrupted central openings 4. The rings 2 are preferably, but not necessarily, of carbon steel.

It is desirable that the material of the rotor rings 2 be a steel which is easy to magnetize, but which also has a relatively high hysteresis loss. The rotor rings are supported upon the shaft 1 by reversely disposed, axially aligned spiders. Each ring supporting spider comprises a pair of non-magnetic flaring shims or quadrants 5, the sides of which are radially disposed at ninety degrees angularity, with a substantially quarter round integral channel at the apices of the shims or quadrants 5 to agree with and enclose the axial shaft 1. Thus the shims or spacers 5 assume a substantially truncated sector shape in that the sides of the spider form the sides of the sector while the apex thereof is truncated to provide the integral channel.

The marginal edges of the shims or quadrants 5 are formed with a shoulder 6 adjacent to one end, and a continuing wing portion 7 enlarged both radially and longitudinally. The opposite ends of the shim margins are preferably slightly rounded or tapered at 8 to facilitate their insertion within the succession of rings 2.

In assembling the rotor the shims or quadrants 5 are inserted from opposite ends of the ring assembly in alternating overlapping relation. Thus, two shims or quadrants are inserted in each end of the ring assembly in diametrically opposite relation until arrested by engagement of the shoulders 6 thereof with the terminal ring face. Another pair of like shims or quadrants are inserted under pressure from the opposite end of the ring assembly in diametrically opposite relation intermediate the pair of shims or quadrants 5 first inserted. There is thus provided an axial concentric cylindrical passage to receive the rotor shaft 1, which may be inserted therein, or the shaft may be axially positioned initially and the shims or quadrants 5 subsequently assembled thereabout.

Figure 2:
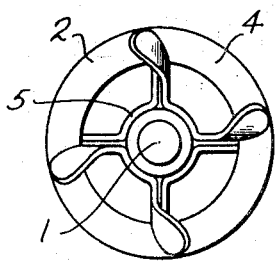
Fig. 2 is an end elevation thereof.
Figure 4:
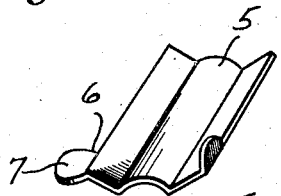
Fig. 4 is a perspective view of one of the spider or supporting segments removed from the assembly.

The disposition of the shims 5 affords in addition to the shaft receiving passage a series of double radial transverse walls within the ring assembly, as shown in the end view Fig. 2. It also affords a series of four equally spaced wing portions 7 protruding beyond the opposite ends of the ring assembly. By slightly twisting the wing portions 7 to inclined relation, such portions 7 may be utilized as fan blades to induce circulation of air through the central opening 4 of the assembly and around the exterior thereof. The wings 7 at the opposite ends of the ring assembly are bent or inclined in directions to supplement each other in creating air circulation. The shims 5 of non-magnetic material being driven tightly in place firmly confine the assembly of rings 2 into a unitary body fixedly clamped upon the rotor shaft 1.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply wtih the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A rotor for a hysteresis type electric motor, including an assembly of concentric contacting magnetizable rings, a rotor shaft axially disposed through the assembly of rings, a plurality of segmental flaring nonmagnetic shims wedged between the shaft and surrounding ring assembly in overlapping relations from opposite ends of the ring assembly, and terminal wing portions on the shims projecting beyond the terminals of the ring assembly, and laterally curved to afford miniature fan blades for circulating air currents through and around the ring assembly.

2. A rotor for a hysteresis electric motor including a tubular transversely laminated body of magnetizable material, a rotor shaft therethrough and a plurality of radial partitions of nonmagnetic material intermediate the rotor shaft and surrounding laminated body having firm wedging contact engagement therewith.

3. A rotor assembly for a hysteresis type motor including a contacting series of concentrically arranged annular laminae of magnetizable material, an axially disposed supporting shaft therethrough, and a series of flaring channel shaped shims of nonmagnetic material tightly interposed between the interior margins of the assembled laminae and the shaft in wedging contact relation therewith maintaining the concentricity of the laminae and the shaft and limiting the magnetic flux to the peripheral portion of the rotor formed by the annular laminae.

4. A rotor assembly for a hysteresis type motor, including a series of contacting concentrically arranged annular laminae of magnetizable material, a plurality of radially disposed shims of nonmagnetic material tightly wedged in overlapping contacting relation from opposite ends of the assembly between the interior margins of the laminae, and the shaft maintaining the concentricity thereof.

5. A spacer shim for a rotor assembly of a hysteresis type motor comprising a flaring truncated sector-shaped channel member of nonmagnetic material insertable within the rotor assembly intermediate the assembly and a supporting shaft.

6. A rotor assembly for a hysteresis type motor, including a laminated magnetizable tubular sleeve, an axially disposed supporting shaft, and a plurality of flaring truncated sector shaped spacers of nonmagnetic sheet material interposed between the magnetizable tubular laminated sleeve and the shaft, with the truncated areas therein abutting the shaft and the margins of the flaring sides of the spacers abutting the interior periphery of the laminated tubular sleeve.

7. A rotor assembly for a hysteresis type motor, including a series of contacting concentrically disposed annular laminae, an axially disposed supporting shaft extending therethrough, radially disposed spacers of nonmagnetic sheet material having wedging engagement with the inner peripheries of the annular laminae and the periphery of the shaft, and integral warped extensions thereon projecting beyond the end of the assembly, for inducing circulation of air relative to the rotor.

8. A spacer shim for a rotor assembly of a hysteresis type motor comprising a flaring sector shaped member of nonmagnetic sheet material, and integral enlarged extensions thereof projecting in unaligned relation beyond the terminal of the rotor assembly, forming fan blades for circulating air currents relative to the assembly.

9. A rotor assembly for a hysteresis type motor including a series of contacting concentrically arranged annular laminae of magnetizable material, an axially disposed supporting shaft, and a plurality of reversely disposed contacting flaring channel shaped spacers of nonmagnetic sheet material interposed from opposite ends of the rotor assembly in tight wedging engagement between the inner peripheries of the annular laminae and the periphery of the coaxial supporting shaft, the inner ends of said spacers being in overlapping contacting relation.

10. A rotor assembly for a hysteresis type motor, including a series of contacting concentric annular laminae, a supporting shaft axially disposed therein, and radial spacers of nonmagnetic sheet material interposed in tight wedging engagement between the inner peripheries of the annular laminae and the periphery of the coaxial shaft.

ARTHUR REYNOLD MEUSSDORFFER.

REFERENCES CITED

The following references are of record in the file of this patent:

UNITED STATES PATENTS

| Number | Name | Date |
|---|---|---|
| 406,599 | Silvey | July 9, 1889 |
| 1,279,591 | Sammarone | Sept. 24, 1918 |
| 1,884,140 | Nickle | Oct. 25, 1932 |
| 2,071,536 | Kalin | Feb. 23, 1937 |

FOREIGN PATENTS

| Number | Country | Date |
|---|---|---|
| 55,070 | Norway | Apr. 8, 1935 |